United States Patent
Zwanenburg

(10) Patent No.: US 6,660,927 B2
(45) Date of Patent: Dec. 9, 2003

(54) SOLAR PANEL WITH CORRUGATED THIN FILM SOLAR CELLS

(75) Inventor: Robert Zwanenburg, Alphen A/D Rijn (NL)

(73) Assignee: Dutch Space B.V., Leiden (NL)

( * ) Notice: Subject to any disclaimer, the term of this patent is extended or adjusted under 35 U.S.C. 154(b) by 0 days.

(21) Appl. No.: 10/180,055

(22) Filed: Jun. 27, 2002

(65) Prior Publication Data

US 2003/0000569 A1 Jan. 2, 2003

(30) Foreign Application Priority Data

Jun. 28, 2001 (EP) .......................................... 01202486

(51) Int. Cl.$^7$ ........................ B64G 1/44; H01L 31/045
(52) U.S. Cl. ...................... 136/244; 136/251; 136/291; 136/292; 136/245; 136/246; 244/173
(58) Field of Search ............................... 136/244, 251, 136/291, 292, 245, 246; 244/173

(56) References Cited

U.S. PATENT DOCUMENTS

| | | | | |
|---|---|---|---|---|
| 3,525,483 A | * | 8/1970 | Van Alstyne | 244/173 |
| 4,030,102 A | * | 6/1977 | Kaplan et al. | 343/915 |
| 4,134,387 A | * | 1/1979 | Tornstrom | 126/684 |
| 4,293,731 A | | 10/1981 | Schweig et al. | 136/245 |
| 4,617,421 A | | 10/1986 | Nath et al. | 136/244 |
| 4,690,355 A | * | 9/1987 | Hornung et al. | 244/173 |
| 5,131,955 A | * | 7/1992 | Stern et al. | 136/245 |
| 5,398,476 A | * | 3/1995 | Knight | 52/698 |
| 6,581,883 B2 | * | 6/2003 | McGee et al. | 244/173 |
| 2002/0157326 A1 | * | 10/2002 | Zwanenburg | 52/71 |

FOREIGN PATENT DOCUMENTS

| | | |
|---|---|---|
| EP | 0 218 858 | 4/1987 |
| EP | 0 734 075 | 9/1996 |
| EP | 0 926 068 | 6/1999 |

* cited by examiner

*Primary Examiner*—Alan Diamond
(74) *Attorney, Agent, or Firm*—Young & Thompson

(57) ABSTRACT

Solar panel includes solar cells affixed to one or more sheet elements and a frame for supporting the sheet elements, wherein the frame is provided with attachment members for attaching the sheet elements to the frame. The attachment members include one or more pretensioned strings, the sheet elements being attached to the strings. Preferably, the sheet elements are composed of flexible material and are attached to the string in a corrugated shape, wherein the sheet elements are provided with at least one row of apertures for weaving a string through successive apertures of the row.

14 Claims, 4 Drawing Sheets

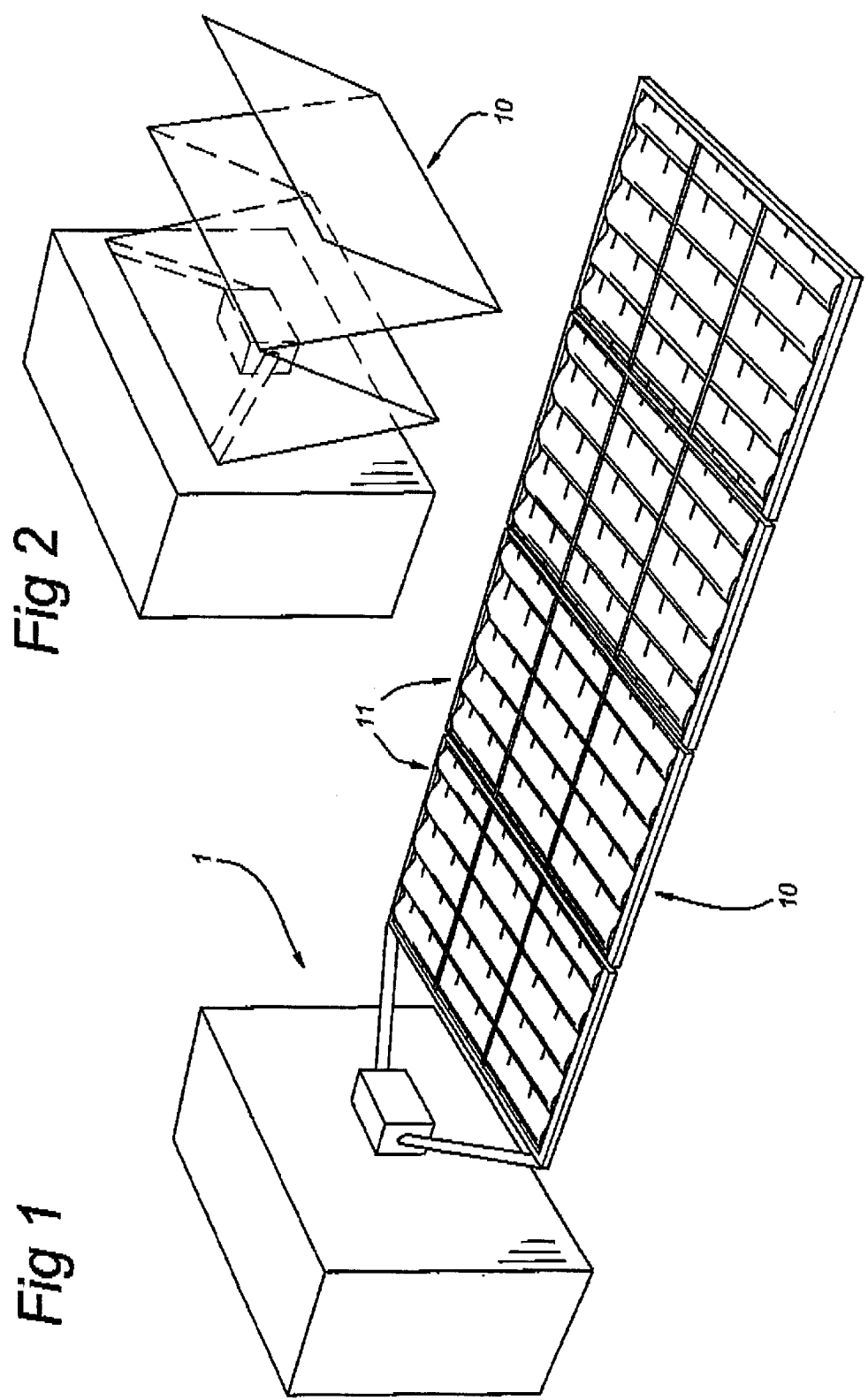

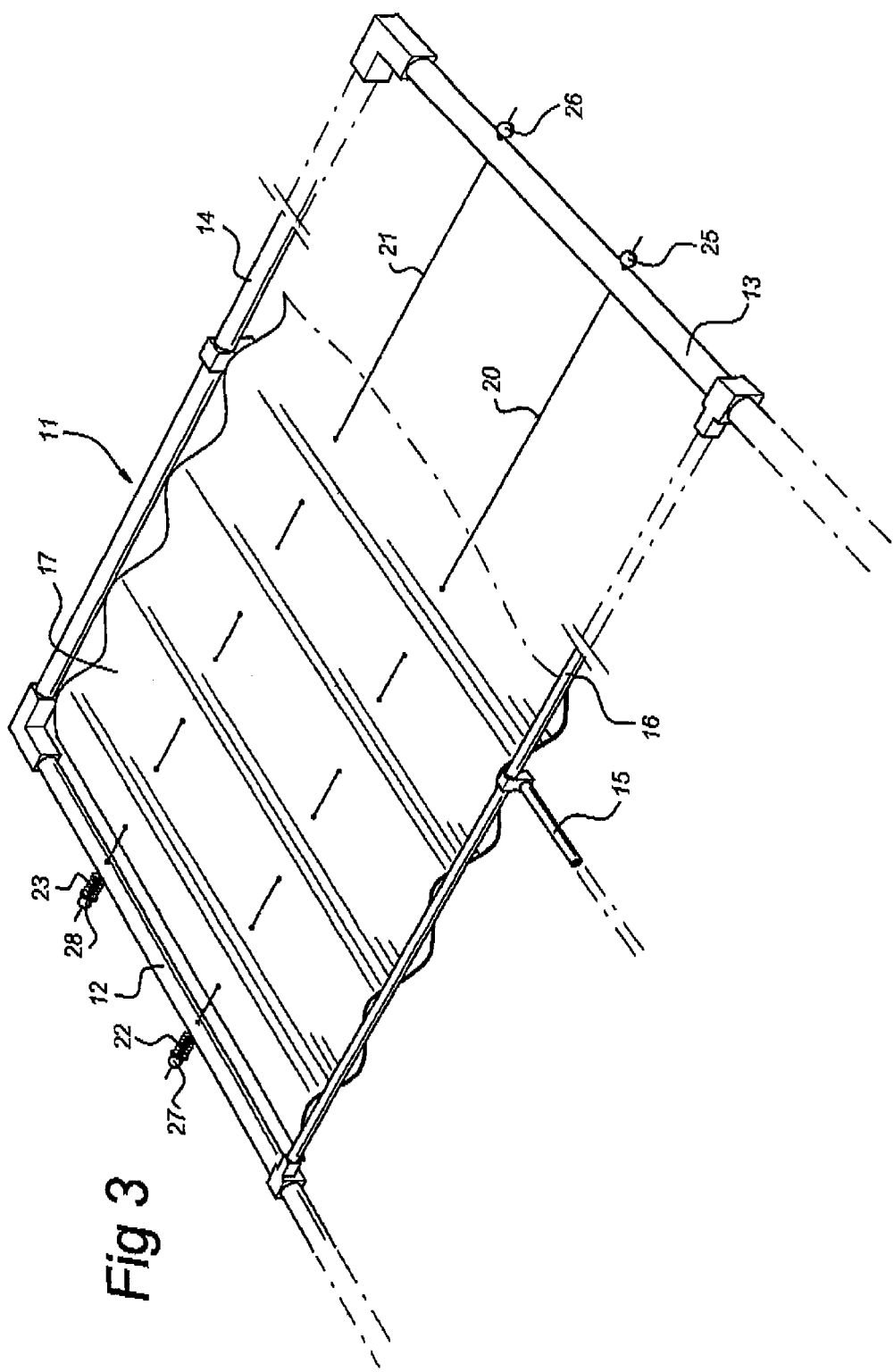

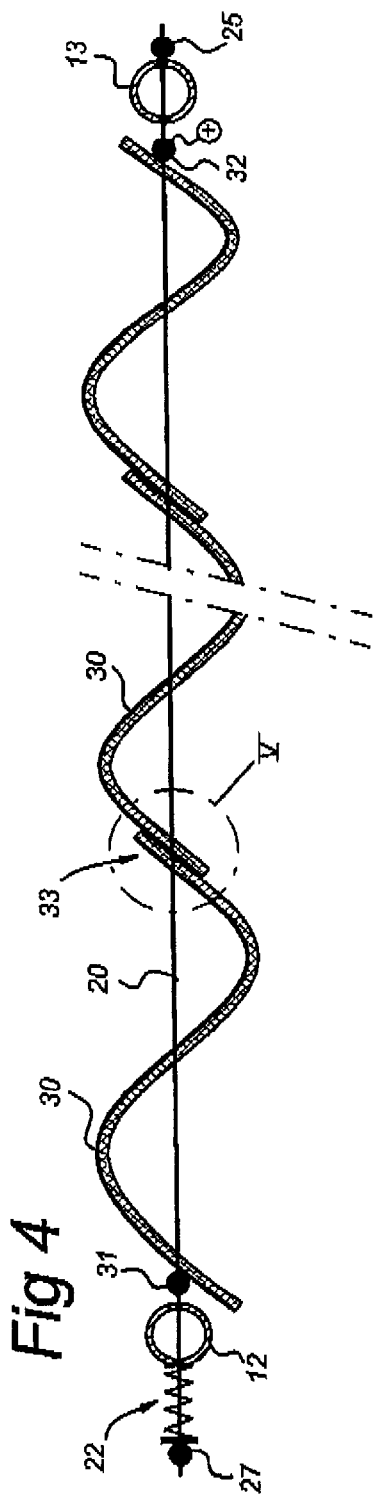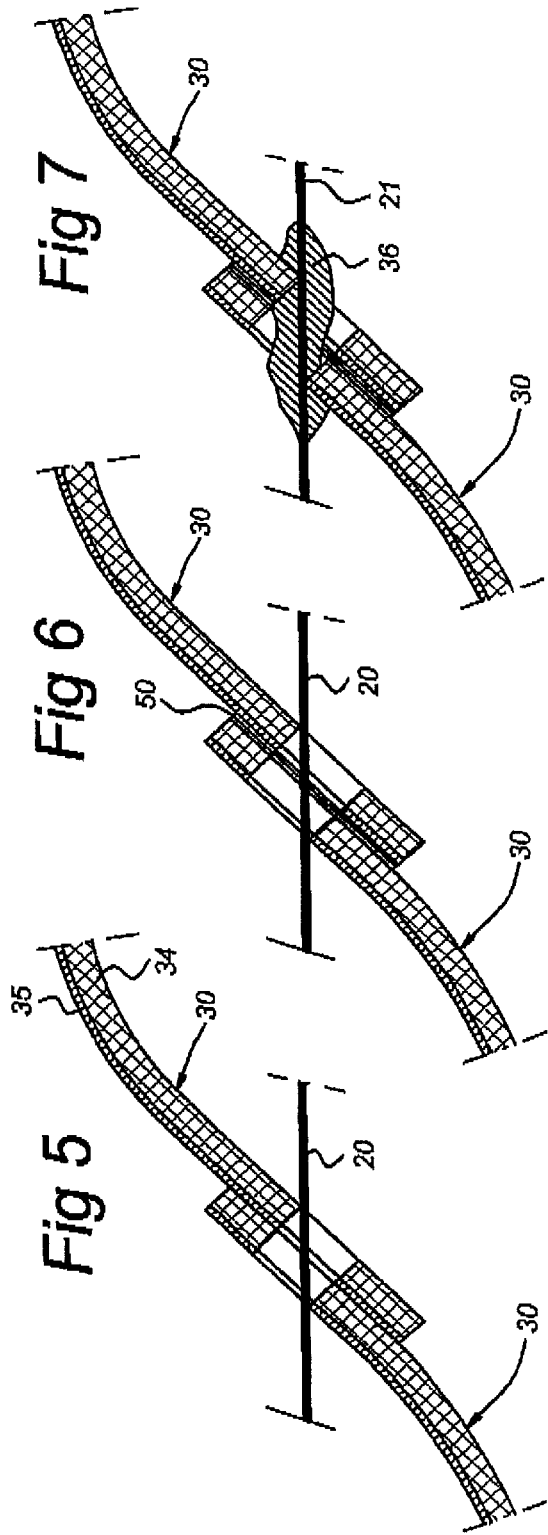

SOLAR PANEL WITH CORRUGATED THIN FILM SOLAR CELLS

The invention relates to a solar panel comprising solar cells affixed to one or more sheet elements and a frame for supporting said sheet elements, wherein the frame comprises one or more pretensioned strings for attaching said sheet elements to the frame, the sheet elements being attached to said strings.

A reduction in solar cell mass can be achieved with a known process to make solar cells with a thin film process. According to this known process the solar cell material is manufactured in the form of thin-films, which comprise multiple layers of e.g. vapour-deposited material. These thin-films are relative delicate and can not be used as structural elements. Therefore, according to the prior art, these thin-films are attached to a backing material such as a sheet of metal or plastic foil.

This backing material is, in order to provide sufficient constructional rigidity, relatively heavy. Especially for spacecraft applications such a heavy backing material should be avoided. Besides, usually the sheet or foil needs to be stressed to increase rigidity of the structure to a sufficient extent. At the interconnects between the cells, stresses will occur. These stresses between the solar cells may lead to difficulties.

U.S. Pat. No. 4,293,731 describes a solar cell generator especially for spacecrafts, consisting of a rectangular frame design with solar cells bonded on a lightweight sheet. Tensioning elements are operatively interposed between the frame structure and the panel sheets. Herein the solar cells are bonded with a small gap between adjacent solar cells and means are interconnected to each other to collect the electrical current and to transfer this electrical current by wires to the spacecraft. Stay wires extend along lateral edges of the sheets. These wires are also secured to the tensioning means.

The thin light-weight sheets of solar cells have certain maximum dimensions limited in the production process. As a result, the frame structure of the solar panel has to be dense, which leads to a high weight.

EP 218 858 discloses a solar panel which comprises solar energy collectors. These collectors are composed of strip-formed mirrors that have solar cells on their back surfaces. The collectors are mounted on supporting strings that extend between two transverse beams of a central mast. Light impinges on the mirrors, which reflect it towards solar cells of adjacent collectors.

The risk of failure of this solar panel is relatively high. During launch, the solar panel is in a folded position. Once in orbit, the solar panels are unfolded, wherein the strings have to be unrolled. The unrolling of the strings involves a complex mechanism that does not comply with the high reliability standards of the space industry.

Another solar panel assembly is known from EP 926 068. This solar panel assembly comprises rectangular panels each carrying solar cells. The panels are pivotally interconnected. Tensioning wires are used to bend the panels in order to increase the structural stiffness of the extended solar panel assembly. The tensioning wires may extend through openings in the panels.

The tensioning wires are operated after unfolding the solar panel assembly from a folded position, which may lead to difficulties. Moreover, the solar cells are not thin film sheets. The panels are therefore not supported in a frame.

The object of the present invention is to provide a solar panel according to the introduction, wherein the structural characteristics thereof are improved.

According to the present invention that object is achieved in that the sheet elements are composed of flexible material and are attached to the strings in a corrugated shape According to the invention it is possible that the sheet elements are provided with at least one row of apertures for weaving a string through successive apertures of said row.

By means of the above-mentioned measures, it is achieved that instead of using a relatively heavy backing material, the sheet elements are attached to a frame for supporting the sheet elements by means of the mentioned pretensioned strings. Since the sheet elements are attached to these strings in a corrugated shape, in the sheet elements a certain amount of elastic bending energy will be stored. The bending lines which are present in the sheet elements provide rigidity for the sheet elements. The combination of using strings and bending the respective sheet elements is sufficient for creating the required rigidity of the solar panel.

Moreover, compared to a known solar panel wherein the solar cells are mounted on a separate pretensioned sheet, mounting solar cells on strings according to the invention strongly or fully reduces stresses between the solar cells at their interconnects, irrespective of pretensioning the strings.

According to a preferred embodiment the solar cells comprise an electrical conductive backing material, which forms said sheet elements.

According to another embodiment the solar cells comprise an electrical conductive backing material, which is mounted on said sheet elements.

If the solar cells with their backing material are bonded to sheet elements, stresses may occur in the solar cell interconnects due to differences in thermal expansion of said solar cells with their backing material on the one hand and the material of said sheet elements on the other hand. Omitting a separate sheet element, i.e. said backing material serves as sheet elements, essentially eliminates such deviating thermal expansion.

According to the present invention it is possible that a series of successive sheet elements is attached to each string or each set of strings.

According to known techniques the dimensions of the individual sheet elements which can be manufactured by means of vapour-deposited materials are limited. In order to be able to provide the solar panel with a sufficient surface area, a series of individual sheet elements has to be provided. Respective sheet elements are attached to the strings in order that the sheet elements themselves abut to adjacent sheet elements.

According to the present invention it is possible that elastic bending energy is stored in each of the sheet elements, wherein the sheet elements are attached to the strings in order to cause the tips of each of the sheet elements to be urged towards the tips of adjacent sheet elements as a result of the bending energy stored in each of the sheet elements.

Because of the fact that the respective elements are urged towards adjacent elements a contact area between said elements is created. This contact area provides the electrical contact between adjacent sheet elements.

According to an alternative embodiment it is possible that the sheet panels are connected to adjacent sheet elements by means of electrical conductive adhesive.

According to a further aspect of the present invention it is preferred that each of the strings is provided with a stop element at respective ends of the string, in order to enclose the sheet elements attached to the string between said stop elements.

The stop elements are at least provided at the respective ends of the strings. The presence of the stop elements provide a very simple and cheap fixing means for fixing the respective bended sheet elements between two stop elements.

According to the present invention it is possible that the stop element is composed of electrical conductive material.

Such an electrical conductive stop element can be used in order to connect an electric wire in order to guide an electric current created in the solar panel into an electric circuit.

According to the invention it is possible that the strings are composed of electrical non-conductive material.

Because of this measure it is avoided that current may leak towards the structural frame of the solar panel. In other words, when the strings themselves are electrical nonconductive no current can be guided through the strings towards a frame part.

It is preferred that each of the strings is provided with at least one spring element at a respective end thereof in order to stretch the respective string.

The spring element will be used in order to stretch respective strings which are present in the solar panel string. When the solar panel is used the strings in the solar panel may lengthen. This may reduce the pretension which is present in the strings. Because of the presence of the spring elements the tension in the strings can be maintained at a required level.

According to a further aspect the invention relates to a solar panel assembly, comprising two or more solar panels according to the present invention. Moreover, the invention relates to a spacecraft which is provided with the solar panel according to the present invention.

BRIEF DESCRIPTION OF THE DRAWINGS

Below the invention will be described wherein reference is made to several figures wherein:

FIG. 1 shows schematically a satellite provided with an assembly of solar panels according to the present invention.

FIG. 2 shows the satellite according to FIG. 1 wherein the assembly of solar panels is folded.

FIG. 3 shows a part of a solar panel comprising the strings and a sheet element which is attached to the string in a corrugated shape.

FIG. 4 shows a string of a solar panel according to the present invention in side elevation wherein to the string a plurality of sheet elements is attached.

FIG. 5 shows a possible embodiment of the connection between adjacent sheet elements.

FIG. 6 shows the embodiment according to FIG. 5 wherein adjacent sheet elements are connected by means of an adhesive.

FIG. 7 shows another embodiment for connecting adjacent sheet elements to the strings.

DETAILED DESCRIPTION OF THE INVENTION

Figure 8:
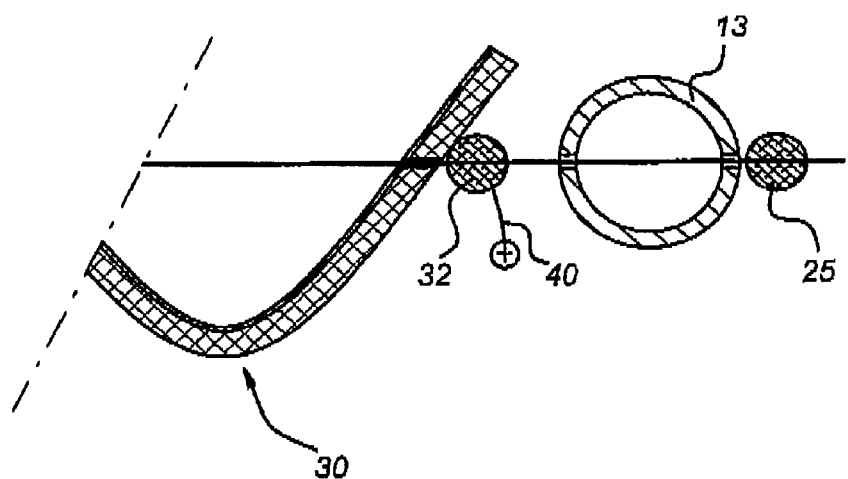
FIG. 8 shows an embodiment of a stop element attached to a string wherein the stop element is electrical conductive.
Figure 9:
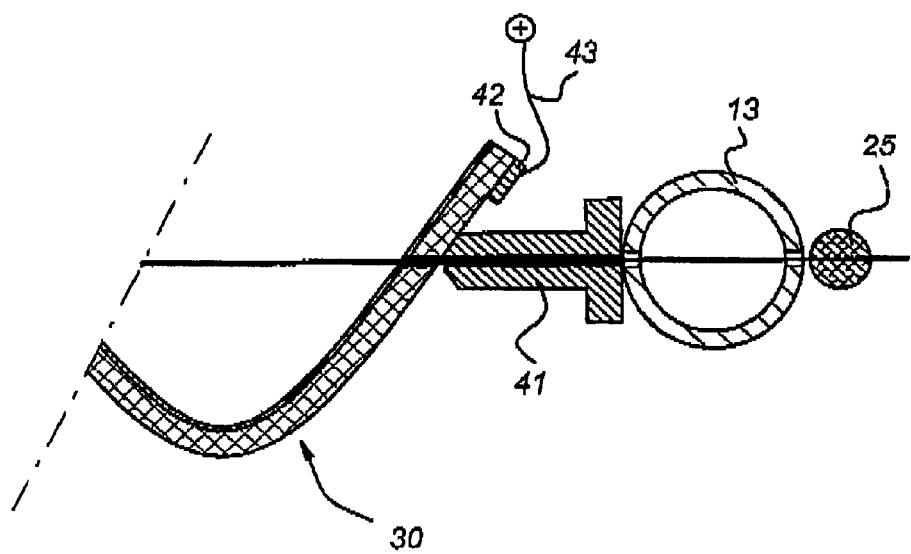
FIG. 9 shows an alternative construction wherein the stop element is formed of an electrical non-conductive material.

In FIG. 1 a satellite 1 is schematically drawn, being provided with an assembly 10 of solar panels 11 according to the present invention. Individual solar panels 11 are each connected to adjacent solar panels in order that the solar panel assembly 10 can be folded (see FIG. 2) or unfolded (as shown in FIG. 1). The solar panel assembly 10 comprising the solar panels 11 is specifically adapted to be used in a spacecraft, since the solar panel assembly 10 has an advantageous light-weight construction.

In FIG. 3 a part of the solar panel 111 is shown schematically. The outer frame has a rectangular shape. The outer frame consists of a first and a second bar, which run in essence parallel at a distance with respect to each other. These bars 12, 13 are connected by means of a transverse beam 14. The construction can be further completed by means of additional bars or beams 15, 16. The solar panel according to FIG. 3 also comprises solar cells which are fixed to one or more sheet elements 17. In FIG. 3 only one sheet element 17 having relatively large dimensions has been drawn. The sheet element itself is thin and rather fragile. The sheet 17 is attached to the frame-elements 12–16 by means of a first 20 and a second 21 string. The sheet element 17 is in this case provided with two rows of apertures for weaving the respective strings 20, 21 through the rows of apertures.

The strings 20, 21 are stretched by means of respective spring elements 22, 23. Because of the presence of these spring elements the strings 20, 21 will be fixed in the frame element 12–16 in a pretensioned state.

The relatively flexible and thin sheet element 17 will be urged in a corrugated form, which is shown in FIG. 3 when the string length of the string 20, 21 passing through the first and end aperture of sheet 17 is reduced in length compared to the original flat length of sheet 17. By forcing sheet 17 into a buckled state a reactive tension inside the string 20,21 will occur.

For reasons of simplicity in FIGS. 3–9 the corrugated shape of the sheet element 17 is exaggerated. In practice, the corrugated shape is a gentle undulation equal just beyond the buckled shape of the sheet element 17.

The strings 20, 21 are provided with respective stop elements 25, 26, 27, 28, in order to avoid that the strings can be removed from the respective bars 12, 13. The method for attaching the sheet element 17 to the strings 20, 21 is more clearly indicated in the following drawings. The sheet element 17 may consist of a plurality of sheet elements 30.

Sheet element 17 may be manufactured from a sheet built up of a thin film photovoltaic layer at an electrical conductive substrate, for example a metal as is disclosed in the publication "Low Cost and Lightweight Amorphous Silicon Solar Array for Space Application" in the proceedings of the 34th Intersociety Energy Conversion Engineering Conference, SAE, Vancouver, August 1999. In the sheet according to the disclosure the photovoltaic layer may have a thickness of 3 $\mu$m and the substrate a thickness of 25 $\mu$m. The material of the substrate is for example a metal or a graphite. The strings 20, 21 may have a core which is a weave of a synthetic material, wherein the outside layer of said strings 20, 21 is an electrical non-conductive material.

FIG. 4 shows a cross-sectional view indicating the bars 12, 13 and one string element, for example 20, which is affixed between respective bars. The string 20 at the end thereof is provided with the stop elements 25, 27. Between stop element 27 and bar 12 a spring element 22 is present in order to pretension string 20. According to FIG. 4 on the string 20 a plurality of sheet elements 30 is attached. A sheet element 30 may be a single thin-film solar cell with only a metal foil backing while the maximum dimensions of each sheet element 30 will be limited to a practical size of the solar cells. FIG. 4 shows sheet element 30 by way of an example in a single up and down wave, however, more waves are possible between the outer ends of sheet element 30. Therefore, in order to create a substantial surface area, each string 20 should be connected to the mentioned plurality of sheet elements 30. At the string 20 two anvil blocks 31, 32 are attached. By means of these anvil blocks in respective sheet elements 30 a certain amount of elastic bending energy is stored. Therefore, the ends of the respective sheet elements are urged towards each other with a certain force. Due to this elastic bending force stored in the respective sheet elements 30 electrical contact between the successive sheet elements is assured. The contact area of two successive sheet elements is indicated schematically with reference number 33 at the circled region V. FIGS. 5, 6, and 7 indicate other embodiments for the specific electrical contact area between the adjacent sheets 30, such as structural bonding, welding, soldering and the mechanical connection by a plastic rivet with a hollow core.

FIG. 5 shows a first embodiment of a contact area between two adjacent sheet elements 30. Each of those sheet elements 30 comprises a substrate 34 with for instance a thickness of 25 µm. The material of the substrate 34 is for example a metal or graphite. On top of this substrate the solar cells 35 are present. The electrical contact between the first and second sheet element 30 according to FIG. 5 is assured only by mechanical forces stored inside the material of the sheets 30.

According to FIG. 6 between a first and a second sheet element an electrical conductive adhesive 50 is present in order to enhance electrical contact between the adjacent sheets.

According to FIG. 7 each of the sheet elements 30 is affixed to the string 21 by means of a non-conductive structural bond 36. The presence of this bond 36 will enhance the rigidity of the corrugated sheet elements 30.

In FIG. 8 a first embodiment of an anvil block 32 is shown. The anvil block 32 (also see FIG. 4) is made of a conductive material. The anvil block 32 can be connected to an electrical wire 40 in order to guide a current towards an electrical circuit. Alternatively, according to FIG. 9, the anvil block 41 can be made of a non-conductive material. In this case on the sheet element 30 a specific contact element 42 can be attached in order to connect the electrical wire 43 to the sheet element 30.

What is claimed is:

1. Solar panel (11) comprising solar cells (35) affixed to one or more sheet elements (17,30) and a frame for supporting said sheet element (17,30), wherein the frame comprises one or more pretensioned strings (20,21) for attaching said sheet element to the frame, the sheet element (17,30) being attached to said strings (20,21), characterized in that each sheet element (17,30) is composed of flexible material and is attached to the strings (20,21) in a corrugated shape.

2. Solar panel according to claim 1, wherein said solar cells (35) comprise an electrical conductive backing material (34), which forms said sheet element (17,30).

3. Solar panel according to claim 1, wherein said solar cells comprise an electrical conductive backing material (34), which is mounted on said sheet element (17,30).

4. Solar panel according to claim 1, wherein the sheet element (17,30) is provided with at least one row of apertures for weaving a string (20,21) through successive apertures of said row.

5. Solar panel according to claim 1, wherein a series of successive sheet elements (17,30) is attached to each string (20,21) or each set of strings.

6. Solar panel according to claim 5, wherein elastic bending energy is stored in each of the sheet elements (17,30), and wherein the sheet elements (17,30) are attached towards the strings (20,21) in order to cause the tips of each of the sheet elements (17,30) to be urged towards the tips of adjacent sheet elements (17,30) as a result of said bending energy.

7. Solar panel according to claim 5, wherein the sheet elements (17,30) are connected to adjacent sheet elements (17,30) by means of an electrical conductive adhesive (50).

8. Solar panel according to claim 5, wherein the sheet elements (17,30) are connected to adjacent sheet elements (17,30) by means of electrical non-conductive rivets.

9. Solar panel according to claim 1, wherein each of the strings (20,21) is provided with a stop element (25,26,27,28) at respective ends of the string (20,21), in order to enclose the sheet element (17,30) attached to the string between said stop elements (25,26,27,28).

10. Solar panel according to claim 9, wherein each stop element (25,26,27,28) is composed of electrical conductive material.

11. Solar panel according to claim 1, wherein the strings (20,21) are composed of electrical non-conductive material.

12. Solar panel according to claim 1, wherein each of the strings (20,21) is provided with at least one spring element (22,23) at a respective end thereof in order to stretch the respective string (20,21).

13. Solar panel assembly (10) comprising two or more solar panels (11) according to claim 1.

14. Spacecraft (1) provided with a solar panel (11) according to claim 1.

* * * * *